United States Patent Office 3,241,856
Patented Mar. 22, 1966

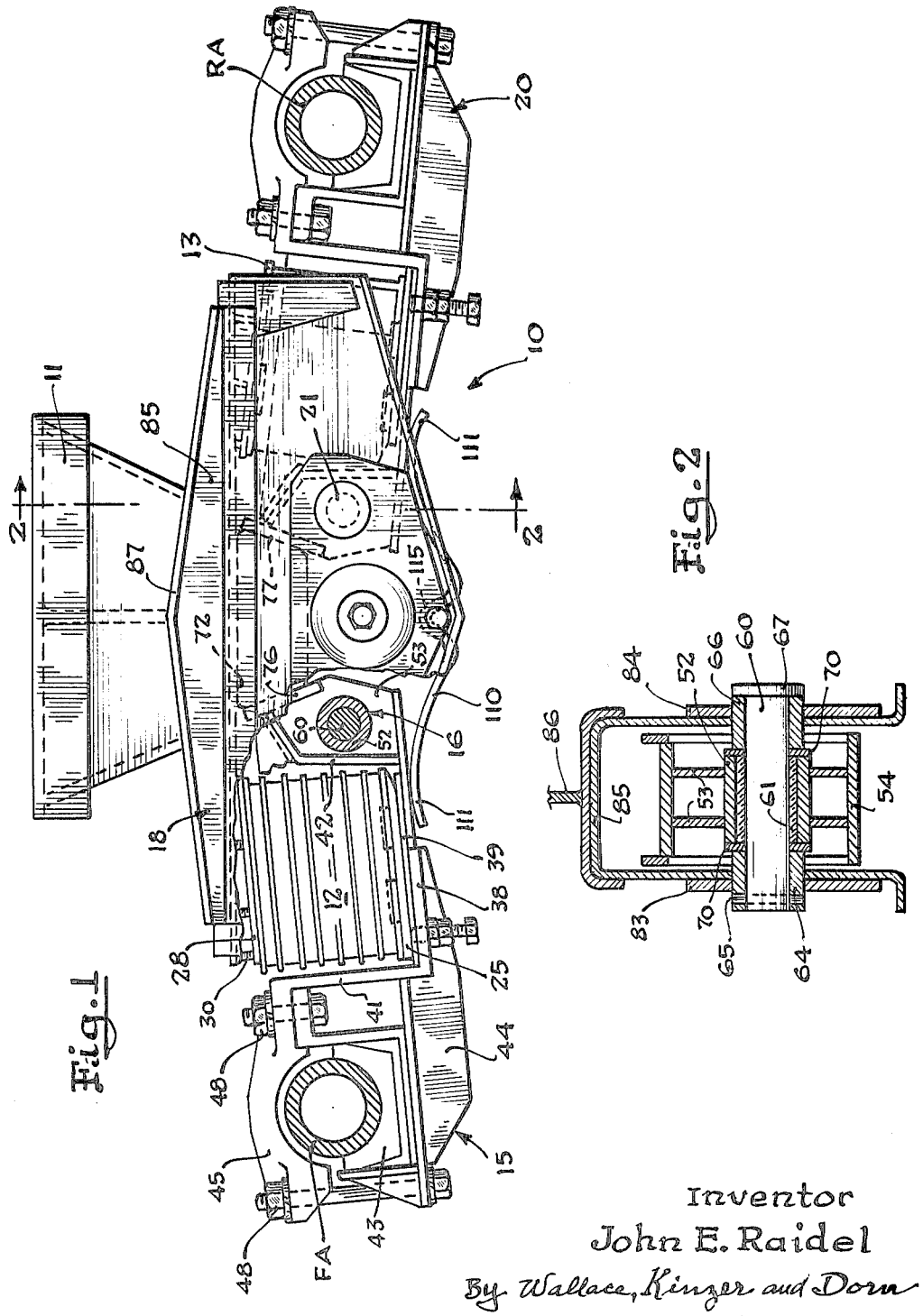

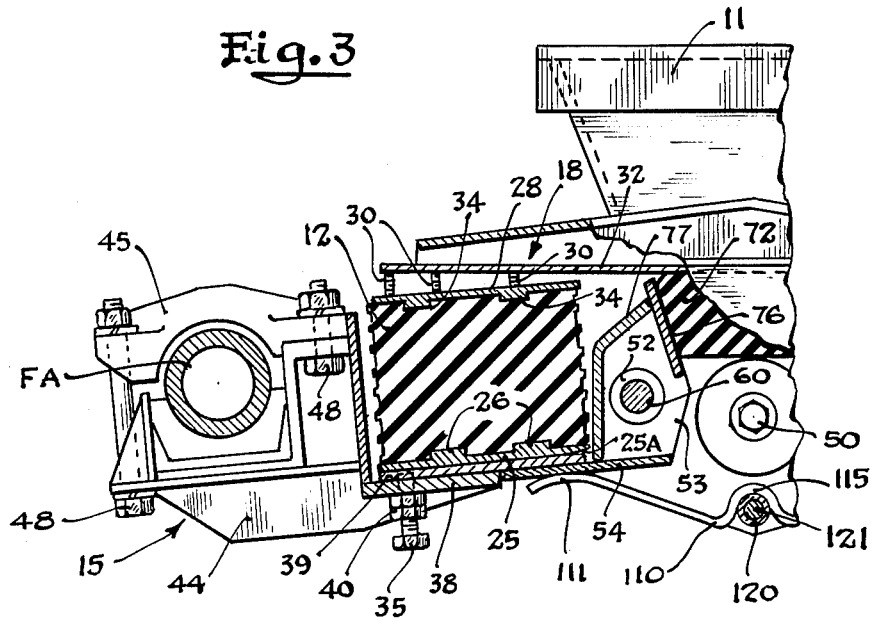
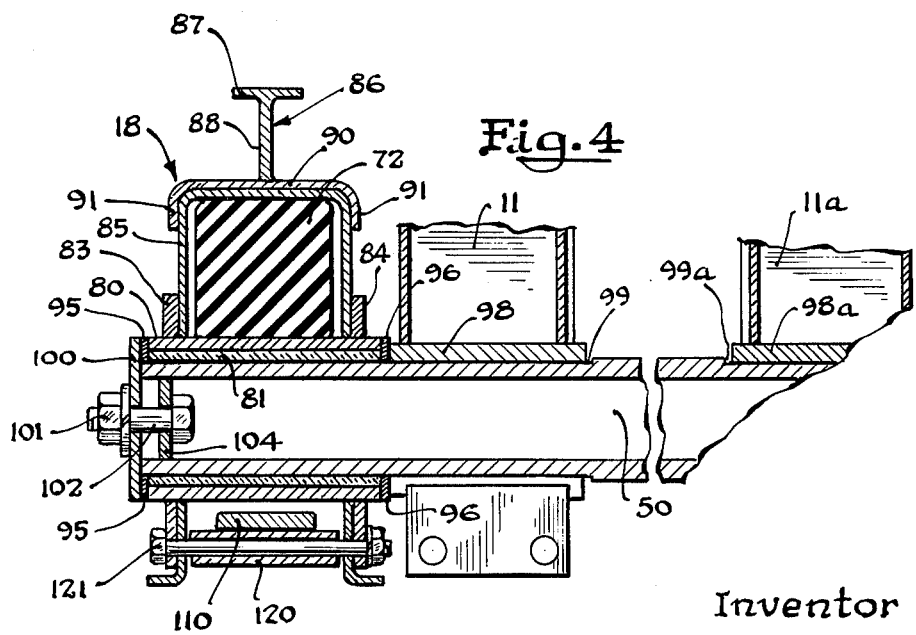

3,241,856
TANDEM SUSPENSION
John E. Raidel, 2306 Sunset Drive, Springfield, Mo.
Filed Nov. 1, 1963, Ser. No. 320,663
6 Claims. (Cl. 280—104.5)

This invention relates to tandem suspensions, particularly of the kind adapted for use on heavy duty trucks and trailers that are commonly employed in cross-country transportation.

One of the most commonly employed tandem suspensions has spaced semi-elliptical springs extending between brackets secured to a frame member of the truck. Secured to each of the springs is an axle supporting the wheels of the vehicle. As the wheels move across rough surfaces or the like, the wheels move up and down relative to the truck trailer. The semi-elliptical springs serve to dampen these up and down movements from being transmitted directly to the trailer and thereby isolate the truck body to a limited extent from such jarring; and also in cases where the load on one axle becomes substantially more than the load on the other axle, the elliptical springs act on an equalizer or beam to transfer a portion of the load from one axle to the other axle. The equalizer normally is pivoted about a bearing means on a trunnion secured to a central bracket and is pivoted by either of the axles to distribute the load or stresses and strains from one axle to another axle thereby insuring relatively level movement of the trailer.

The present invention is directed to and has for its principal object a tandem suspension of a new and radically different construction capable of absorbing road shock without the use of semi-elliptical springs, and capable of allowing pivotal movement of one axis relative to the other axis without employing torque arms to align longitudinally the axles.

Another object of the present invention is the absorbing of road shock by a resilient and compressible element disposed between equalizer and axle carrying assemblies pivotally mounted on the equalizer, so that as an axle assembly partakes of pivotal movement due to rough condition of the road, the axle carrying assemblies compress the resilient compressible element. Specifically, in accordance with a further object of the invention, the resilient and compressible element is preferably a block of rubber material or the like, capable of being preloaded with a light compression and capable of having this compression varied so that the amount of compression can be varied for no load, light loads or heavy loads of the truck and trailer. Thus, in the preferred embodiment of the invention, and as one of its objects, a novel tandem suspension employs rubber blocks as the spring means to afford a softness of ride for the trailer.

Under the present invention, and in accordance with a further object thereof, the blocks of resilient material serve as main springs to absorb the major portion of the stress and strain, and a secondary or supplemental block of material serves as an additional resilient means acting complementary to the main spring.

The tandem suspension of the present invention functions to equalize the load and/or movement between the axles, in accordance with a further object of the invention by rotating a compensating beam or equalizer through a resilient block, which when sufficiently compressed, transmits a force to the compensating beam to pivot the compensating beam to transfer a portion of the movement and load to the other axle pivotally mounted on the compensating beam.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevational view broken away in section in part showing the tandem suspension according to the preferred embodiment of the invention;

FIG. 2 is a sectional view taken along the line 2—2 in FIG. 1 in the direction of the arrows showing the pivotal connection between a compensating beam and axle supporting assembly;

FIG. 3 is a sectional view showing a rubber block serving as a cushion type of connection between the axle supporting assembly and the compensating beam; and FIG. 4 is a sectional view taken through a trunnion mounting showing the pivotal mounting of the compensating beam on the trunnion.

A complete tandem suspension for a truck trailer or the like includes a pair of front and rear axles FA and RA extending across the body of the trailer and having double wheels (not shown) at the ends of each of the axles FA and RA. The tandem suspension is secured to the frame of the trailer (not shown) by opposed brackets, such as the brackets 11 and 11a, FIGS. 1 and 4. However, the conventional tandem suspension employs in addition to a central bracket such as bracket 11, both front and rear brackets, to which the spaced ends of semi-elliptical springs could be connected, and additionally employs torque arms connected between the brackets and the axles. The semi-elliptical springs of the prior art tandem suspensions absorbed the road shock generated as the wheels move along a rough surface, and in the present suspension the semi-elliptical springs have been eliminated and replaced by compression elements or spring means 12 and 13, preferably a block of rubber material, although an air bag, coil springs, cellular blocks of rubber with air spaces therein or other suitably compressible materials could be employed.

The forward one of the compression spring means 12 is compressed when a front axle supporting assembly 15 pivots clockwise about a connection 16 on a compensating beam 18 and squeezes the spring means 12 disposed between the front axle supporting assembly 15 and the compensating beam 18. Thus, as a front axle FA carrying the front wheels of the tandem suspension pivots in a clockwise direction as seen in FIG. 1, the block of resilient rubber is compressed against the compensating beam 18 and the rubber thereby serves to dampen any vibrations or road shock imparted to the compensating beam 18. In a similar manner, a rear axle RA has a rear axle supporting assembly 20, pivotally mounted at 21 to compress a rear compression spring means 13 against the compensating saddle 18 during a counter-clockwise rotation of the rear axle RA about the pivotal connection 21.

The resilient spring means 12 and 13 are preferably rectangular-shaped blocks composed completely of rubber or like material, as shown in FIG. 3, although the blocks could be reinforced with metal inserts, composition or fabric inserts to give added torsional strength to the rubber block. However, due to the geometric relationship between the supporting means for the rubber block, the main forces applied to the block are compression forces, as will be hereinafter explained.

In the detailed description hereinafter, the front axle FA, the front axle supporting assembly 15, and the front portion of the compensating saddle are described in detail. As will be evident from the drawings and the description, the rear axle RA, rear axle supporting assembly 20, and rear portion of the compensating saddle 18 are identical in construction and function to the corresponding elements in the front of the tandem suspension.

As best seen in FIG. 3, the block of resilient material 12 is seated on a supporting plate 25, which has a pair of upwardly projecting bosses 26 located in complementary shaped recesses or openings in the rubber block 12 for holding the block 12 against shifting or sliding movements in either the lateral or longitudinal directions. The upper surface of the resilient block 12 is disposed in contact with an upper plate 28 on the compensating beam 18. The upper plate 28 is secured by a plurality of spacer elements 30 of progressively varying heights to a web 32 of the compensating beam 18. The spacers 30 are of such dimensions as to hold the plate 28 at an angle or incline to the web 32 in order to make the plate 28 be parallel to the lower supporting plate 25. Thus, the plate 28 will be in uniform and flush engagement over the entire surface of the rectangular block of resilient material 12.

The plate 28 is advantageously supplied with depending bosses 34 which fit within complementary shaped sockets or recesses in the resilient block of material 12, in order to assist the lower bosses 26 on plate 25 to prevent the block from sliding relative to its supporting plates 25 and 28.

It is preferred that the spring rate be capable of being adjusted, or, stated differently, that the spring means 12 be capable of being loaded by predetermined amounts so as to compensate for the type of load being carried by the truck or trailer. Thus, the softness or amount of compression of the spring means 12 can be varied to compensate for difference in loading. The resilient blocks 12 and 13 can be compressed or preloaded to a predetermined degree by rotating an adjusting screw 35 through a leg plate 38 and a supporting plate 39 on the axle supporting assembly 15 to move upwardly and thereby bear with increasing force on the bottom surface of the supporting plate 25. The bottom surface of plate 25 has a pocket or recess therein for receiving the end of the adjusting screw 35. After loosening a pair of locking nuts 40, the turning of the adjusting screw 35 upwardly through the leg 38 and plate 39 causes the left end of the supporting plate 25, as seen in FIG. 3, to rotate about a beveled or rounded end 25A and press against the resilient block 12.

The spring means 12 and supporting plate 25 are not secured to the supporting plate 39, but are maintained in the general position shown in FIGS. 1 and 3 between vertical end plates 41 and 42 which are rigid and fixed portions of the front axle supporting assembly 15. The front axle supporting assembly 15 includes an axle support casting 44 having an integrally formed seat portion 43 for the axle FA, an end plate portion 42 and an outwardly extending leg portion 38. The front axle FA is, of course, journaled in the axle seat portion 43 of the front axle supporting assembly 15, and is held therein by an upper cap or housing casting 45, which is secured to the lower casting 44 by spaced nut and bolt fasteners 48. It is to be understood that the axle FA extends across the truck body to an opposite half of the tandem suspension on which are supported the opposite wheels. The opposite tandem suspension (not shown) is supported by a bracket 11a (see FIG. 4). The brackets 11 and 11a are both secured to a trunnion shaft 50.

Under the present invention, the front axle supporting assembly 15 is pivoted to the equalizer or compensating beam 18 by means of a collar 52 rotatably supported on a shaft 60 in the compensating beam 18. The collar 52 is secured between a pair of opposed plates 53 upstanding from a bottom supporting plate 54 secured to the supporting plate 39. Preferably, the supporting plate 39 is welded to the leg 38 of the casting 44, and in turn the bottom plate 54 is welded along the bottom surface of the supporting plate 39 so as to be a rigid extension thereof. Thus, the supporting plate 39 and the axle casting 44 are rigidly joined together to constitute the front axle supporting assembly 15, which is rotatably mounted by the collar 52 on the shaft 60. Thus, the axle FA and wheels thereon are pivotally mounted for rotation about the shaft 60 as the wheels move vertically due to bumps and depressions in the road.

As shown in FIG. 2, the collar 52 may have an interior lining of bearing material 61 to facilitate rotation. The collar 52 is held against axial movement on the shaft 60 between sleeve 64, which is secured by a pin 65 to the shaft 60, and a sleeve 66 secured by an end plate 67 to shaft 60. The collar 52 is free to rotate on the bearing 61 about the shaft 60, and likewise, a pair of thrust bearing washers 70 are disposed between the sleeves 64 and 66 and the collar 52, facilitating rotation of the collar 52 about the shaft 60.

In addition to the resilient blocks 12 and 13 that function as main springs for the tandem suspension 10, there is provided a centrally disposed spring means 72 of the compression type, preferably in the form of a block of resilient material, FIG. 3. The spring means 72 is adapted to be compressed by either the front axle supporting assembly 15 or by the rear axle supporting assembly 20. The spring means 72 functions as a secondary or complementary spring and floats freely over the compensating beam 18 and directly on the trunnion shaft 50. As best seen in FIG. 3, the spring means 72 has an inclined face disposed in contact with a compression plate 76 on the axle supporting assembly 15. The compression plate 76 is secured as by welding to the vertical and spaced plates and is backed by an angular portion 77 of the end plate 42 secured to the bottom plate 54. Thus, the compression plate 76 is rigidly secured to the axle supporting assembly 15, which, through leg 38 and compression plate 76, can compress both the main spring means 12 and the supplemental spring means 72.

The secondary spring means 72 can, if desired, be comprised of a material having a significantly different hardness than the main spring means 12 so as to be of particular advantage for heavy loads. For instance, the supplemental spring means 72 can be of much harder or less readily compressible material than the material of spring means 12 and 13 and thus come into compression for heavy loads to limit the amount of compression and deflection which would result if the spring means 12 would undergo if acting alone. That is, for a light load, the spring 12 would act substantially independently of the resilient block 72; whereas with a heavy load, the compression plate 76 would be operative to engage and compress the resilient block 72 to aid in supporting the heavy load. The supplemental spring means 72 is nested against an opposing compression plate 77, FIG. 1, carried on the rear axle supporting assembly 20. Manifestly, the counterclockwise rotation of the rear axle supporting assembly compresses the main spring means 13 and the supplemental spring means 72.

The compensating beam 18 can be rotated about the trunnion shaft 50 in the manner of an equalizer beam. The beam 18 is supported at its middle portion by the beam collar 80, which is journaled for rotation about a sleeve type bearing 81 on the trunnion 50. The beam collar 80 is suitably secured as by welding to opposed stiffening plates 83 and 84 which, in turn, are suitably secured as by welding to an inverted U-shaped channel member 85, which constitutes the major structural member of the compensating beam 18.

The compensating beam 18 has an additional structural supporting rail or strut 86 secured as by welding along the top surface of channel 85. As best seen in FIGS. 1 and 4, the rail 86 has a transverse upper flange 87 at the upper surface of a web 88. The web 88 increases in height from the outer ends to the medial portion of the rail 86. As seen in FIG. 4, the lower portion of the rail 86 is a generally flat horizontal flange 90 with ends 91 turned down to embrace the sides of the channel 85. Thus, it will be seen that the transverse beam is a structural member fabricated from a relatively thin-walled channel 85, on the upper surface of which is secured a stiffening strut or rail 86, and to the sides of which are secured thick stiffening plates 83 and 84. As thus constructed, the fabricated compensating saddle or beam 18 has sufficient strength to support the axles FA and RA, and to transfer loads between these axles when the compensating beam 18 is rotated by one of the main springs 12 or 13 to distribute the load to the opposite axle.

The compensating beam 18 is held against axial movement on the trunnion 50, FIG. 4, between a pair of washers 95 and 96 preferably of brass or other bearing type of material. The bearing washer 96 is abutted against the end of a trunnion collar 98 which is fixedly secured to trunnion shaft 50. The trunnion shaft 50 is secured between the brackets 11 and 11a, and has shoulders 99 and 99a which prevent axial movement of the trunnion shaft 50 relative to collars 98 and 98a. Hence, the trunnion shaft 50 remains stationary.

To retain the bearing washer 95, a retaining washer 100 is engaged against the outer bearing washer 95 and the retaining washer 100 is held against the end of the trunnion shaft 50 by a bolt and nut type fastener 101 having a shank 102 extending between a fixed interior plate 104 in the interior of the trunnion shaft 50. Thus, tightening of the bolt and nut fastener 104 causes the washer 100 to compress the bearing 95 and the collar 80 against the opposite bearing 96, so as to hold the collar 80 against axial displacement.

It will be remembered that the front and rear axle supporting assemblies 15 and 20 are respectively pivoted to the compensating beam by pivotal connections 16 and 21 so that the axles are free to rotate in either a counterclockwise or clockwise direction about their respective pivotal connections. To assure that the axles FA and RA do not drop downwardly when there is a depression beneath the wheels thereon, the compensating rail 10 is provided with a flat spring retainer 110 having opposed end portions 111 engaging the underside of the axle supporting brackets 44, FIG. 1. Thus, spring retainer 110 biases each of the axles FA and RA against a sudden downward movement when the wheels on the axle FA or RA are dropping into a depression on the road. The spring retainer 110 has a central curved configuration 115 disposed over a roller or bearing 120 disposed on a bolt type fastener 121. The roller 120 is beneath the trunnion shaft 50 and spans the strengthening plates 83 and 84 on the side walls of the compensating beam 18. When thus held in position, the ends 111 of the spring retainer 110 bias the front axle supporting assembly 15 from counterclockwise rotation as seen in FIG. 1, and bias the rear axle support plate 20 from turning in a clockwise direction about the pivotal connection 21, FIG. 1.

From the foregoing, it will be seen that the present invention employs a pair of spaced compression spring means disposed between axle supporting assemblies and the trailer to dampen and cushion road bounce and shock imparted to the axles by the wheels. Also, under the present invention, a supplementary compression spring means is provided in addition to the main springs. Furthermore, the axle supporting assemblies are held against downward movement by a leaf spring 110, which has portions 111 engaging the axial supporting assemblies 15 and 20 to bias the assemblies 15 and 20 against a sudden downward movement or rotation due to a depression in the road.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. In a tandem suspension for a truck trailer or the like wherein wheel-carrying axles are supported beneath the truck trailer and are permitted pivotal movement relative to the truck trailer, and wherein a portion of the load from one axle is capable of being transferred to the other axle, said suspension including, a bracket affixed to the truck trailer and depending therefrom; a compensating lever means being pivotally mounted on said bracket and being adapted to pivot to transfer a portion of a load from one axle to the other axle; opposed receiving portions in said compensating beam disposed on opposite sides of said pivotal mounting for said compensating beam; a compressible means disposed in each of said receiving portions of said compensating lever means; a front and rear axle supporting means, each being individually and pivotally connected to said compensating lever means for rotation relative to said trailer and relative to said compensating lever means; a compressing surface on each of said axle supporting means being engageable with said compressible means and being adapted to compress said compressible means within said receiving portions of said lever means in response to rotation of a respectively associated axle supporting means; a spring means on said compensating lever means biasing each of said axle supporting means against rotation in a direction opposite to that direction of rotation in which said resilient mass is compressed; and preloading means for loading said compressible means with a predetermined amount of compression.

2. In a tandem suspension for a truck trailer or the like wherein wheel-carrying axles are supported beneath the truck trailer and are permitted pivotal movement relative to the truck trailer, and wherein a portion of the load from one axle is capable of being transferred to the other axle, said suspension including; a bracket means fixedly secured to said truck trailer and depending therefrom; a compensating beam including an inverted channel member including a top wall and opposed side walls, said compensating beam being pivotally mounted on said bracket for transferring a portion of the load from one axle to the other axle; compressible spring means disposed in opposite end portions of said channel; a front and rear axle supporting means, each being pivotally mounted on said compensating beam, each of said axle supporting means permitting rotational movement of said axles while holding said axles against longitudinal movement relative to the truck trailer; a compressing plate on each of said axle supporting means underlying their respectively associated compressible spring means; said compressing plates being adapted to compress a spring means upon rotation of said axle supporting means toward said truck trailer; and retainer spring means disposed on said compensating beam and engaging said axle supporting means to urge said axle supporting means against pivotal movement in a direction downward from said truck trailer.

3. In a tandem suspension for a truck trailer or the like wherein wheel-carrying axles are supported beneath the truck trailer and are permitted pivotal movement relative to the truck trailer, and wherein a portion of the load from one axle is capable of being transferred to the other axle, said suspension including; a bracket means fixedly secured to said truck trailer and depending therefrom; a compensating beam including an inverted channel member including a top wall and opposed side walls, said compensating beam being pivotally mounted on said bracket for transferring a portion of the load from one axle to the other axle; compressible spring means disposed in opposite end portions of said channel; a front and rear axle supporting means, each being pivotally mounted on said compensating beam, each of said axle supporting means permitting rotational movement of said axles while holding said axles against longitudinal movement relative to the truck trailer; a compressing plate on each of said axle supporting means underlying their respectively associated compressible spring means, said compressing plates being adapted to compress a spring means upon rotation of said axle supporting means towards said truck trailer; retainer spring means disposed on said compensating beam and engaging said axle supporting means to urge said axle supporting means against pivotal movement in a direction downward from said truck trailer; and preloading means in engagement with each of said compressible spring means and adjustable to vary the spring rate of each of said compressible means to compensate for different loading conditions of the truck trailer.

4. In a tandem suspension for a truck trailer or the like wherein wheel-carrying axles are supported beneath the truck trailer and are permitted pivotal movement relative to the truck trailer, and wherein a portion of the load from one axle is capable of being transferred to the other axle, said suspension including; a bracket means fixedly secured to said truck trailer and depending therefrom; a compensating beam including an inverted channel member including a top wall and opposed side walls, said compensating beam being pivotally mounted on said bracket for transferring a portion of the load from one axle to the other axle; blocks of rubber disposed in opposite end portions of said channel; a front and rear axle supporting means, each being pivotally mounted on said compensating beam, each of said axle supporting means permitting rotational movement of said axles while holding said axles against longitudinal movement relative to the truck trailer; a supporting and compressing plate on each of said axle supporting means underlying their respectively associated block of rubber and each being adapted to compress a block of rubber upon rotation of said axle supporting means towards said truck trailer; retainer spring means disposed on said compensating beam and engaging said axle supporting means to urge said axle supporting means against pivotal movement in a direction downward from said trailer; and a block of rubber disposed between said front and rear axle supporting means and being compressible by either of said front and rear axle supporting means.

5. In an equalizing tandem suspension for trailers or the like wherein spaced wheel carrying axles are pivotally mounted for movement relative to the frame of the trailer supported thereby, bracket means including a pivoted equalizing beam means adapted to be secured to the frame of said trailer for transferring movement of one axle to the other of said axles, front axle supporting means supported by said bracket means for pivotal movement with said front axle, rear axle supporting means supported by said bracket means for pivotal movement with said rear axle, spring means disposed between each of said respective axle supporting means and said equalizing beam means, pivotal movement of one of said axle supporting means causing a deformation of its associated spring means and thereby exerting a force on said equalizing beam means to transfer the load to the other axle supporting means, and spring means disposed between said front and rear axle supporting means and compressible by either of said front and rear axle supporting means to transfer motion directly from one supporting means to said other supporting means.

6. In an equalized tandem suspension for a truck trailer or the like wherein wheel carrying axles are supported beneath the truck trailer and are permitted pivotal movement relative to the truck trailer and wherein a portion of the load from one axle is capable of being transferred to the other axle, said suspension including: bracket means including compensating beam means for securing to said truck trailer, said compensating beam means having overhanging portions extending in a generally horizontal plane and extending outwardly from a pivotal connection to said bracket means, front axle supporting means supported by said bracket means for supporting said front axle for pivotal movement, rear axle supporting means supported by said bracket means for supporting said rear axle for pivotal movement, each of said axle supporting means having a compressing portion disposed beneath one of said respective overhanging portions of said equalizing beam means, a first block of resilient material supported on said compressing portion for said front axle supporting means and underlying said overhanging portion of said compensating beam for said front axle, and a block of resilient material supported on said compressing portion for said rear axle supporting means and underlying said overhanging portion of said compensating beam means.

References Cited by the Examiner
UNITED STATES PATENTS 2,197,727   4/1940   Ledwinka _____ 267—21 X
2,265,518   12/1941  Coote _____ 280—104.5

A. HARRY LEVY, *Primary Examiner.*

MILTON BUCHLER, BENJAMIN HERSH,
*Examiners.*